March 18, 1930.   A. WOLLENSAK   1,750,830
VIGNETTING SHUTTER
Filed Oct. 31, 1928
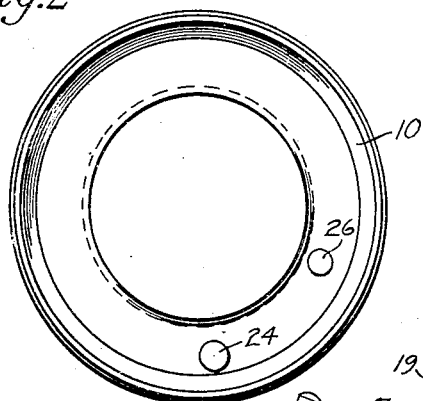
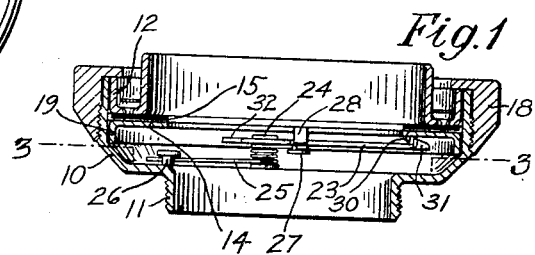
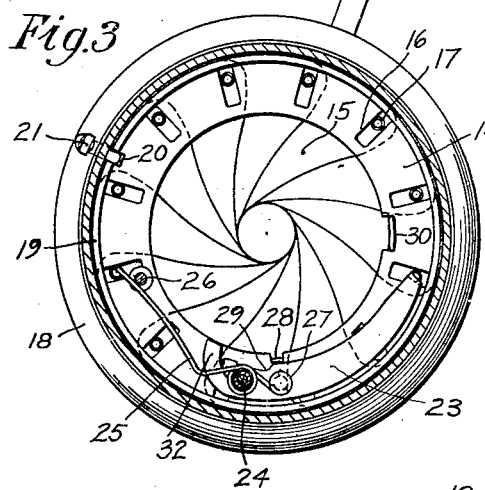
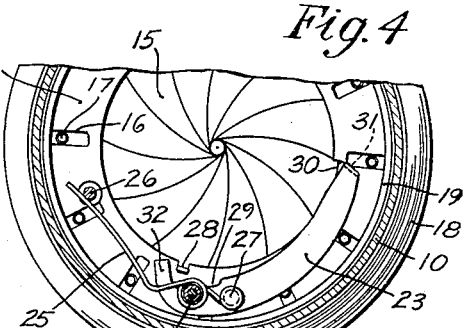
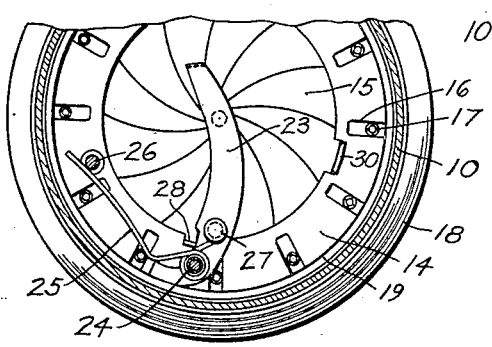
INVENTOR
Andrew Wollensak
BY
Farnum F. Dorsey
his ATTORNEY Patented Mar. 18, 1930

1,750,830

UNITED STATES PATENT OFFICE

ANDREW WOLLENSAK, OF ROCHESTER, NEW YORK, ASSIGNOR TO WOLLENSAK OPTICAL COMPANY, OF ROCHESTER, NEW YORK, A CORPORATION OF NEW YORK

VIGNETTING SHUTTER

Application filed October 31, 1928. Serial No. 316,233.

This invention relates to a shutter for use in connection with a motion-picture camera, the purpose of the shutter being to produce, upon the film, the effect of the gradual dissolution or fading of the view. The nature of this fading depends upon the position of the shutter with respect to the lens, but the shutter of the present invention is designed particularly for use in front of the lens, where it will cause the view to fade chiefly at the margin, and at the same time to contract in diameter, the center of the view being the last part to disappear.

For the purpose in question, a shutter having the form of an ordinary iris diaphragm may be used, except for the fact that such a diaphragm, as ordinarily constructed, has always a minimum central opening which cannot be closed by the blades of the diaphragm. One purpose of the present invention is to combine, with such diaphragm, a simple means in the form of a pivoted blade, which is moved and controlled by connection with the means which move the diaphragm blades, and which is caused to swing quickly into position to cover the remaining central opening as the diaphragm blades reach their final position.

In the use of a motion picture camera, particularly by amateurs, it is desirable to economize in the expenditure of film, so far as possible, and in fading out a view the camera should be stopped immediately upon the completion of this operation. A further object of the invention, accordingly, is to provide the vignetting shutter with means for giving to the user an audible signal that the operation has been completed. To this end the shutter of the present invention is so constructed that the center-closing blade, before referred to, is actuated by a spring, with a snapping action, so that it produces an audible click when coming to rest in its closed position.

In the accompanying drawings Fig. 1 is a horizontal, axial section of a vignetting shutter embodying the present invention. Fig. 2 is a front elevation of the body member or shell of the shutter. Figs. 3, 4 and 5 are rear elevations of the shutter, in section on the line 3—3 in Fig. 1, showing successive positions of the parts as the shutter is closed; and Fig. 6 is a plan view of the shutter, with the outer ring in section.

The invention is illustrated as embodied in a shutter comprising a body member or shell 10, provided with a threaded neck 11 by which it may be attached to the lens tube of a motion-picture camera. The shell is partly closed, in front, by a ring 12 which is secured in place by screws 13 (Fig. 6). In the rear of the ring 12 is a generally flat ring 14 which is free to turn within the shell. In the narrow space between the rings 12 and 14 a series of blades 15, constituting an iris diaphragm, are mounted, these blades overlapping in the usual manner and having connection with the actuating ring 14 through the usual slots 16 and pins 17, so that the iris may be opened and closed by turning the ring within the shell.

The outer surface of the shell is screw-threaded to receive an outer ring 18, which is held in place by the threads but is free to turn upon the shell through a limited angle. The actuating ring 14 has a marginal flange 19 in which is a notch 20, and the shell has an arcuate slot in line with the flange 19, as shown in Fig. 6. A screw pin 21, fixed in the outer ring 18, extends inwardly through the slot in the shell, and its inner end engages the notch 20, so that by turning the outer ring the actuating ring may be turned through an arc sufficient to operate the iris blades. A handle 22 is fixed in the outer ring to facilitate the operation of turning it.

The parts so far described are not substantially different from those usually embodied in a diaphragm of the iris type, and the present invention resides in the combination, with these parts, of the mechanism which will next be described.

The auxiliary shutter member or blade hereinbefore referred to has the form of a flat sheet-material member 23, as shown in Figs. 1 to 6, inclusive which is mounted on a pivot stud 24 projecting forwardly from the rear wall of the shell 10. A spring 25 is coiled around the pivot stud, and one end of the spring is seated against a pin 26 also projecting from the shell, while the other end of the spring engages a pin 27 on the shutter blade. The spring tends to swing the blade into the position of Fig. 5, but this is normally prevented by a lug 28 which is struck up from the inner edge of the actuating ring. In the wide-open position of the iris this lug engages the inner edge of the shutter blade 23 near its free end, thus holding the blade retracted. As the actuating ring is turned to close the iris blades the lug 28 moves towards the pivot 24, but still holds the shutter blade back, as shown in Fig. 3.

Near its pivotal point the shutter blade has a cutaway portion or recess 29 at its inner edge, and upon reaching this point the lug 28 loses control of the blade. However, the actuating ring has a second lug 30, which is adapted to cooperate with a lug 31 formed by bending forwardly the free extremity of the shutter blade. When the lug 28 moves over the recess 29 the spring 25 swings the blade into the position of Fig. 4, where its motion is temporarily arrested by the lugs 30 and 31. Continued movement of the actuating ring results, however, in moving the lug 30 beyond and out of engagement with the lug 31, and this action is so timed as to occur just as the iris blades reach their position of minimum opening. Upon such disengagement of the lugs the spring instantly swings the shutter blade to the position of Fig. 5, where it covers the remaining central opening.

The shutter blade is arrested in the position of Fig. 5 by means of a stop-tail 32, which engages the flange 19 of the actuating ring. When this engagement occurs the sudden arrest of the blade causes an audible click, which indicates that the closing of the shutter has been completed.

When the actuating ring is turned back to open the shutter the lug 28 swings the shutter blade back to its original position. Interference at this time between the lugs 30 and 31 is avoided by making the latter in bevelled form, as shown in Fig. 1, so that it may yield and slide over the lug 30, owing to the elasticity of the shutter blade.

The invention claimed is:

In a vignetting shutter, the combination of an iris diaphragm, a shutter blade pivoted near the periphery of the diaphragm, a spring tending to swing said blade into position to cover the diaphragm opening, manually operable means for moving the diaphragm at a speed directly under the control of the operator, and interengaging members, on the shutter blade and said manually operable member, for swinging the blade positively to open position as the diaphragm is opened, and for holding the blade in open position, against the opposition of its spring, as the diaphragm is moved toward closed position, said interengaging members being arranged to release the blade as the diaphragm reaches its position of minimum opening, to permit the blade to swing freely to closed position, under the influence of the spring, at a speed independent of the speed with which the manually-operable member is moved.

ANDREW WOLLENSAK.